(12) United States Patent
Totale

(10) Patent No.: US 10,282,394 B1
(45) Date of Patent: May 7, 2019

(54) COMPOSABLE DOCKING NAVIGATION FOR OPTIMIZED APPLICATION INTERACTION

(71) Applicant: EMC IP Holding Company LLC, Hopkinton, MA (US)

(72) Inventor: Sachin G. Totale, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 187 days.

(21) Appl. No.: 15/083,873

(22) Filed: Mar. 29, 2016

(51) Int. Cl.
*G06F 17/22* (2006.01)
*G06F 16/958* (2019.01)
*G06F 3/0483* (2013.01)
*G06F 3/0484* (2013.01)

(52) U.S. Cl.
CPC ........ *G06F 17/2205* (2013.01); *G06F 3/0483* (2013.01); *G06F 3/04847* (2013.01); *G06F 16/958* (2019.01); *G06F 17/2247* (2013.01)

(58) Field of Classification Search
CPC ............. G06F 17/2205; G06F 17/3089; G06F 17/2247; G06F 3/04847; G06F 3/0483
See application file for complete search history.

(56) References Cited

U.S. PATENT DOCUMENTS

| | | | | |
|---|---|---|---|---|
| 2005/0071755 A1* | 3/2005 | Harrington | ......... | G06F 17/2247 715/229 |
| 2006/0074904 A1* | 4/2006 | Mungara | ........... | G06F 17/30893 |
| 2006/0075071 A1* | 4/2006 | Gillette | ............ | G06F 17/30067 709/219 |
| 2006/0080397 A1* | 4/2006 | Chene | .................... | H04L 67/00 709/213 |
| 2007/0033407 A1* | 2/2007 | MacKay | ............... | H04L 63/062 713/171 |
| 2008/0010387 A1* | 1/2008 | Curtis | ................. | G06F 17/3089 709/246 |
| 2008/0040661 A1* | 2/2008 | Curtis | ................. | G06F 17/3089 715/243 |
| 2008/0046415 A1* | 2/2008 | Henkin | ............ | G06F 17/30867 |
| 2011/0145930 A1* | 6/2011 | Gnech | ................. | G06F 21/6218 726/28 |
| 2011/0154507 A1* | 6/2011 | King | ...................... | G06F 17/218 726/28 |
| 2011/0252304 A1* | 10/2011 | Lemonik | ............. | G06F 17/3089 715/234 |
| 2011/0296336 A1* | 12/2011 | Law | ....................... | G06F 3/0483 715/777 |
| 2012/0036552 A1* | 2/2012 | Dare | ................... | H04L 41/0253 726/1 |
| 2012/0042279 A1* | 2/2012 | Naderi | ................ | G06F 3/04855 715/786 |
| 2013/0347055 A1* | 12/2013 | Motoyama | ............. | G06F 21/00 726/1 |
| 2014/0047413 A1* | 2/2014 | Sheive | .................. | H04L 65/403 717/110 |
| 2014/0245015 A1* | 8/2014 | Velamoor | ............ | H04L 63/061 713/171 |

(Continued)

*Primary Examiner* — Nicholas Klicos
(74) *Attorney, Agent, or Firm* — Van Pelt, Yi & James LLP

(57) ABSTRACT

A first indication to dock a page associated with a web-based application is received. In response to receiving the first indication, a docked page is saved. A second indication to display the docked page is received and in response to receiving the second indication, the docked page is displayed in the web-based application.

15 Claims, 9 Drawing Sheets

(56) References Cited

U.S. PATENT DOCUMENTS

| | | | |
|---|---|---|---|
| 2014/0324779 A1* | 10/2014 | Forbes | G06F 17/30575 707/634 |
| 2015/0082148 A1* | 3/2015 | Lai | G06F 17/214 715/235 |
| 2015/0310188 A1* | 10/2015 | Ford | G06F 21/10 726/28 |
| 2017/0147545 A1* | 5/2017 | Amoli | G06F 17/24 |

* cited by examiner

```
{
    "id": "colombo.task.list.view",
    "config": {
        "title": "User Tasks",
        "dockable": true     302
}
```

Configuration information for a page called "User Tasks"

FIG. 3

COMPOSABLE DOCKING NAVIGATION FOR OPTIMIZED APPLICATION INTERACTION

BACKGROUND OF THE INVENTION

Increasingly, employers (especially large companies) are requiring their employees to use web-based applications as part of their job. For example, there may be some task which they are required to complete via the web-based application and the employee may have to use the web-based application on a daily, or at least regular, basis. Oftentimes, these web-based applications provide access to a large body of information (e.g., in the back end) and/or must apply access rules (e.g., to customize the web-based application for that particular user) before rendering a page. This means that some users who are required to use such a web-based application are delayed by slow response time. For example, suppose the web-based application provides access to an enterprise content management system and the user has to complete some tasks (e.g., finish writing a draft, review a document and markup the document with comments and/or edits, approve of a document, distribute a document, etc.) associated with various documents stored in the enterprise content management system. Alternating between a page which displays that user's outstanding tasks and other pages associated with completing a specific one of those tasks can be slow because the enterprise content management system is large and it may take time to customize the page that is rendered to the user (e.g., in light of recently completed tasks, newly assigned tasks, access permissions for that user, etc.). New techniques which permit faster rendering of pages associated with web-based applications would be desirable.

BRIEF DESCRIPTION OF THE DRAWINGS

Various embodiments of the invention are disclosed in the following detailed description and the accompanying drawings.

FIG. 3 is a diagram illustrating an embodiment of configuration information associated with the page of a web-based application.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
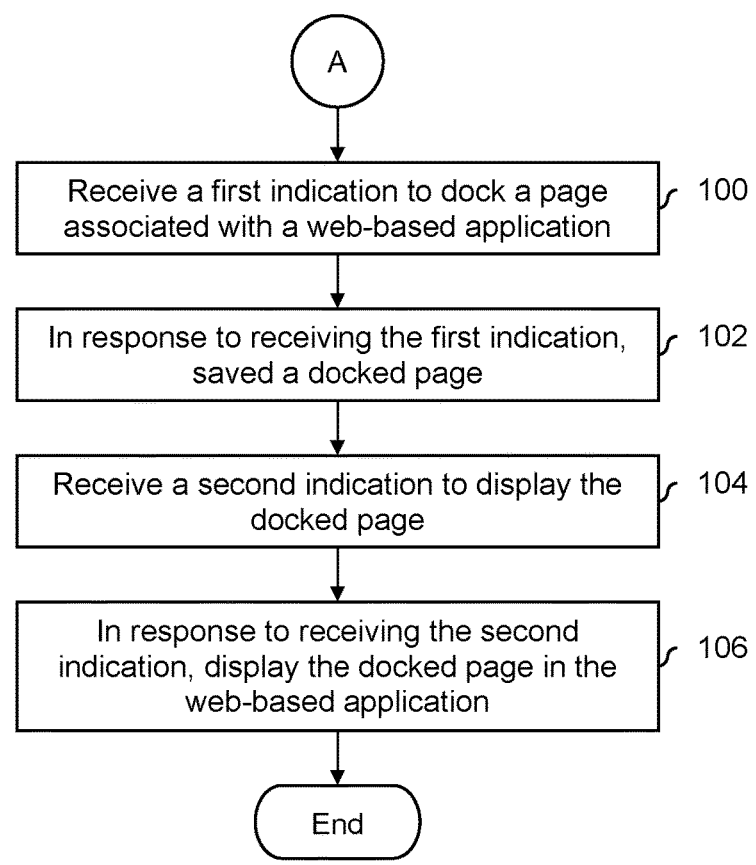
FIG. 1 is a flowchart illustrating an embodiment of a process to generate and display a docked page.

FIG. 1 is a flowchart illustrating an embodiment of a process to generate and display a docked page. As will be described in more detail below, docked pages permit faster display of pages associated with a web-based application. For example, if the web-based application has to perform some filtering on a large collection of documents or other content before displaying a page to a user, the performance improvement can be significant. For example, the web-based application may provide access to an enterprise content management system where a user is typically permitted to access some, but not all, of the content in the enterprise content management system based on that user's access permissions.

At 100, a first indication to dock a page associated with a web-based application is received. In examples described below, those pages which are permitted to be docked have some user interface control associated with docking that page (if desired) displayed in each such page (e.g., a button, a radio button, a hyperlink, a context menu, etc.). If the user wants to dock a particular page, then the user interface control is interacted with in the appropriate manner (e.g., selecting, clicking, etc.). Naturally, any type of user interface control may be used to receive the first indication.

At 102, in response to receiving the first indication, a docked page is saved. In various embodiments, the docked page is saved locally to a user's device (e.g., a laptop computer, a desktop computer, a smartphone, a tablet, etc.) and/or the docked page is saved remotely (e.g., to some application server associated with the web-based application). For example, if the docked page is saved locally, then the web-based application may use the Internet browser application which it is running on to save the docked page (e.g., in the memory allocated to the Internet browser application). In some embodiments, the docked page is saved to one or more user-specified locations.

At 104, a second indication to display the docked page is received. As with the first indication, any type of user interface control may be used to receive the second indication.

At 106, in response to receiving the second indication, the docked page is displayed in the web-based application. In some examples described below, there is a bookmark icon in each page which (if clicked) takes the user to a page which lists the docked pages and (as a default) displays the docked page which was docked first.

Although some examples described herein show a user deciding when to dock a page and when to display a docked page, in some embodiments, the first indication and/or second indication is/are generated automatically. For example, the web-based application may automatically generate a first indication to dock a page (e.g., at step 100) anytime the user navigates to a new page. Older docked pages may be automatically deleted by the web-based application if a newer version of that page is docked in order to save space. Then, if a particular page is taking too long to load and there is a corresponding docked page, the web-based application may automatically display the docked page. To put it another way, the web-based application may automatically issue a second indication at step 104 if some timer is exceeded.

Or, in another example, the web-based application may be configured to automatically dock pages and send the docked pages to some application server (e.g., associated with the web-based application). The docked pages on the application server then serves (if desired) as an audit trail which records or otherwise tracks the actions of the user. In some embodiments, a web-based application automatically docks a page whenever a document is accessed or some action is performed on a document (e.g., edit, print, download, approve, annotate, forward, etc.). Those interactions with the web-based application which trigger automatic docking of a page may be specified in some configuration file or set of configuration information. Naturally, automatically docked pages may serve some other purpose than providing an audit trail.

The following figure shows an example system which may perform the process of FIG. 1 and illustrates an example of how the process of FIG. 1 can improve performance.

Figure 2:
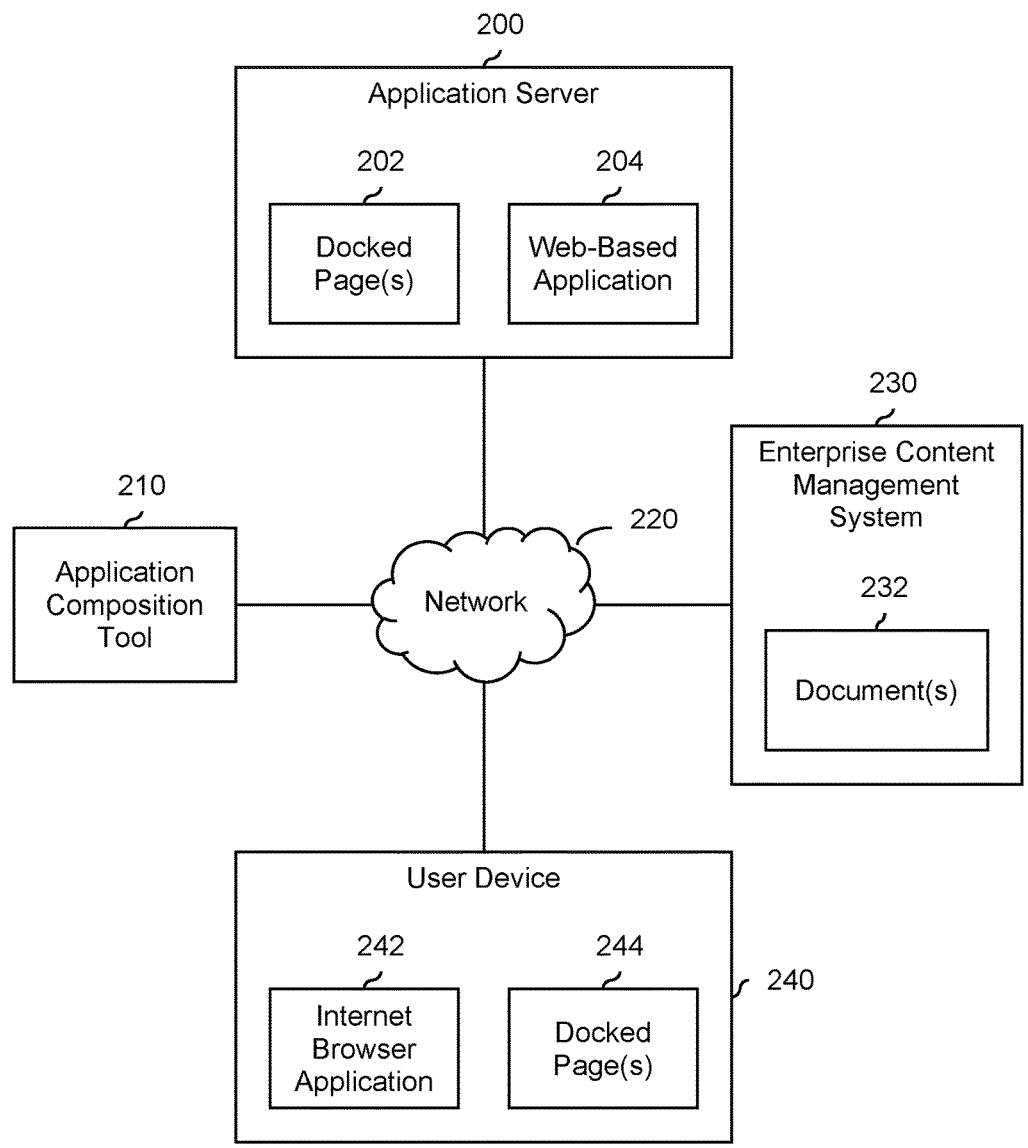
FIG. 2 is a diagram illustrating an embodiment of an enterprise content management environment which supports docked pages.

FIG. 2 is a diagram illustrating an embodiment of an enterprise content management environment which supports docked pages. In the example shown, enterprise content management system 230 is a platform for storing and managing documents or other content according to that business's business processes and/or some content lifecycle. One example of an enterprise content management system is EMC Documentum.

When installed "out of the box," enterprise content management system 230 does not have an application built which enforces a business's business processes and/or some content lifecycle. For example, suppose a company wants to use EMC Documentum to track and manage the development of drugs as they goes to market (e.g., by tracking and managing documents relating to and/or in support of the various Food and Drug Administration drug trials and review processes). Web-based application 204 (which stores information in and retrieves information from enterprise content management system 230, in this example in the form of document(s) 232) may be created to ensure that the company's business process and content lifecycles are followed. For example, web-based application 204 ensures that users have access only to those documents which they are permitted to access. For example, the user may only have access to documents which relates to products that user is working on. Or, if the user is a more senior employee who is responsible for reviewing and/or approving of documents, the web-based application may expose tools or services associated with reviewing and/or approval to that user. Generally speaking, enterprise content management system 230 is not specific to and/or customized for a particular business. Rather, it is web-based application 204 which is customized for a specific business (e.g., to ensure that any business-specific rules and/or processes are enforced).

To assist in the creation of web-based application 204, application composition tool 210 is provided. For example, application composition tool 210 may be EMC's xCP Designer. The web-based application which is created by application composition tool 210 is stored in application server 200 as web-based application 204.

Web-based application runs on Internet browser application 242 on user device 240. For example, user device 240 may be some computer (e.g., a laptop or desktop), a smartphone, a tablet, etc. Some example Internet browser applications include Mozilla Firefox and Google Chrome. It is noted that the documents and/or services which are made available to a particular user via web-based application may depend upon the particular user.

In various embodiments, docked pages are stored on user device 240 (see docked page(s) 244) and/or on application server 200 (see docked page(s) 202). Storing docked pages on the user device may be desirable because it permits the user to access a page even if application server 200 and/or enterprise content management system 230 is/are unavailable (e.g., when offline). For example, a docked page may include some documents or other content from enterprise content management system 230. If network connection 220 goes down such that user device 240 can no longer access enterprise management system 230, the user would not be able to view a given page which includes such documents. However, with docked page(s) 244 stored locally, the docked page(s) can be presented to the user.

In some embodiments, docked pages are stored on application server 200. Storing docked pages on application server 200 may be desirable because it permits subsequent processing of the docked pages even after Internet browser application 242 is closed and docked page(s) 244 is/are no longer available on user device 240. For example, the user may share some docked pages with other users. For example, the user may assemble some customized group of tasks or documents that the user wants other users to have access to. By docking and sharing a page, the user can ensure that the other users "see" the same page (and objects within that page) that the user does. This may include context or state information which would otherwise be transient and unavailable once the Internet browser application is closed. For example, the user may jot a note down for others to read but may not necessarily want to save that note in a document or have that note recorded in the enterprise content management system. Docking a page would save that note or other context or state information. In various embodiments, various scopes or amounts of information may be saved in a docked page.

One benefit to the process of FIG. 1 (which exists even if enterprise content management system 230 is accessible) is that using a docked page improves the system performance. For example, it is typically faster to display one of docked page(s) 244 to a user via Internet browser application 242 instead of a corresponding non-docked page. With a non-docked page, enterprise content management system 230 would need to be contacted and there would need to be a determination as to what documents stored thereon are appropriate for that particular user (e.g., based on that user's access privileges) and/or context (e.g., based on a user's specification about what document(s) she is searching for and/or what page she has navigated to) which takes longer. This enables a user to navigate more quickly between pages and (at least in this example) complete tasks using a web-based application. Using docked page(s) 244 also conserves network resources which may then be used for the benefit of other devices.

Even if docked page(s) 202 on application server 200 is displayed to a user via Internet browser application 242, the performance of the system improves because the determination about what documents to access is avoided and the docked page is already in some renderable or displayable form.

Naturally, the configuration shown here is merely exemplary and is not intended to be limiting. For example, the process of FIG. 1 may be used in a variety of environments or systems and is not necessarily confined to enterprise content management systems.

FIG. 3 is a diagram illustrating an embodiment of configuration information associated with the page of a web-based application. In this example, each page has its own configuration file (or, more generally, a set of configuration information associated with that page) and each configuration file or set of configuration information includes a dockable setting or variable. Configuration information 300 is associated with a page called "Users Tasks" (not shown) and the dockable setting (302) for this page is set to true which permits this page to be docked, if desired. For example, the web-based application may know from this dockable setting to display (e.g., in the User Tasks page) some user interface control to cause the User Tasks page to be docked, if desired.

In some cases, the dockable configuration is set to false, such that the associated page is not permitted to be docked (e.g., even if desired). For example, it may not make sense and/or may be undesirable to dock certain pages, such as the login page or the logout page. In some embodiments, an application designer specifies what pages can be docked and what pages cannot be docked, for example by setting the dockable setting for each page in web-based application. In some embodiments, if no value is specified for a particular page's dockable setting, then the default setting is false.

A web-based application may use the dockable settings in the configuration information in order to know which pages should include a user interface control associated with docking that page. The following figures shown an example of such a process.

Figure 4:
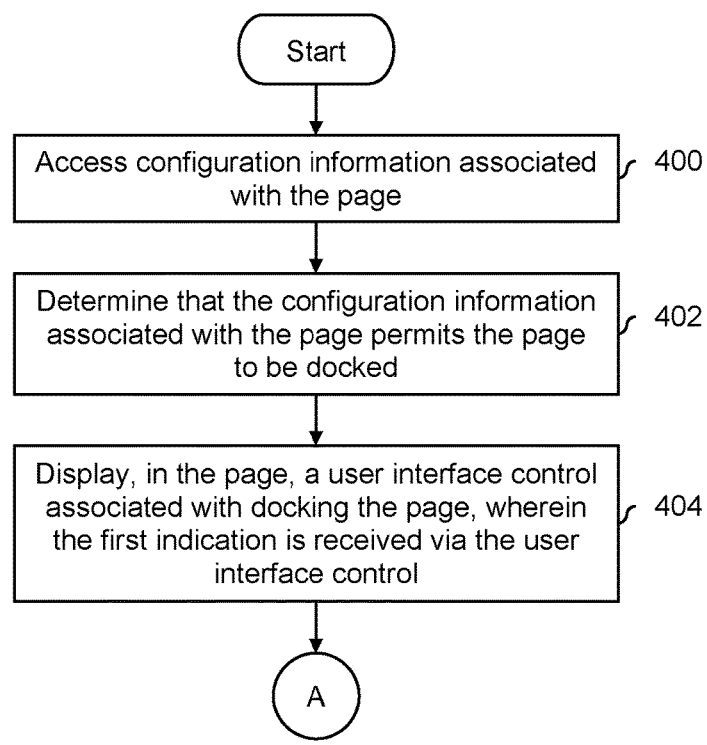
FIG. 4 is a flowchart illustrating an embodiment of a process to display a user interface control associated with docking a page.

FIG. 4 is a flowchart illustrating an embodiment of a process to display a user interface control associated with docking a page. In some embodiments, the process of FIG. 4 precedes that of FIG. 1. In some embodiments, the process of FIG. 4 is performed any time a new page is rendered or otherwise displayed (e.g., in response to clicking on a link, pressing a button, selecting a new page from a pulldown menu, etc.). In some embodiments, the process of FIG. 4 is skipped when a docked page is retrieved and displayed. For example, it may not make sense to display a docking button when that page is already docked. In some embodiments, some other types of user interface controls are displayed for docked pages.

At 400, configuration information associated with the page is accessed. See, for example, configuration information 300 shown in FIG. 3. As described above, in some embodiments, each page has its own configuration file or set of configuration information and in such embodiments the configuration information associated with that page is accessed.

At 402, it is determined that the configuration information associated with the page permits the page to be docked. For example, dockable setting 302 in FIG. 3 is set to true for the associated User Tasks page.

At 404, a user interface control associated with docking the page is displayed in the page, wherein the first indication is received via the user interface control. The following figures show an example of a docking bookmark which permits docking of the associated page (if desired).

Figure 5:
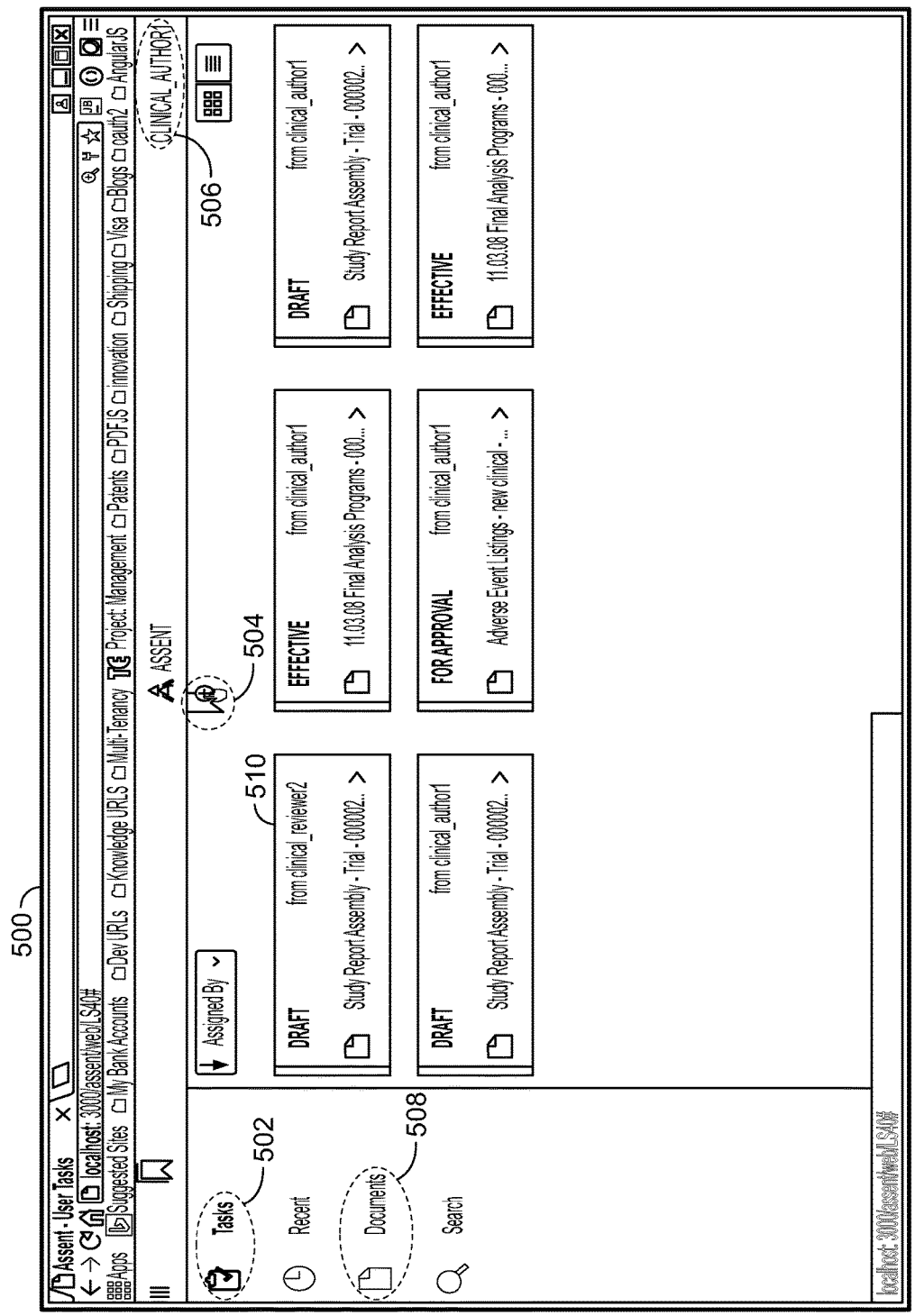
FIG. 5 is a diagram illustrating an embodiment of a Tasks page which includes a docking bookmark to dock that page, if desired.

FIG. 5 is a diagram illustrating an embodiment of a Tasks page which includes a docking bookmark to dock that page, if desired. In the example shown, the user interface control which permits docking of a page is shown as a bookmark (referred to herein as a docking bookmark) but naturally any type of user interface control may be used and the technique is not limited to bookmarks.

In this particular example, the web-based application is associated with a pharmaceutical and/or biotech company. Page 500 is the starting page or home page which is displayed by the web-based application after a particular author (shown in user identifier 506) has logged in. In this starting state, tasks (502) is selected in the column on the left and page 500 shows the tasks which are assigned to the user (in this example, clinical_author1). Since the example web-based application is for a pharmaceutical and/or biotech company, the exemplary tasks shown are associated with drafting, reviewing, and/or approving various studies, reports, and trials related to some drug and/or medical treatment.

Docking bookmark 504 is one example of a user interface control associated with docking a page. In this example, the user decides to dock page 500, so a copy of page 500 (referred to herein as a docked page) is saved in response to docking bookmark 504 being selected or pressed. As described above, the docked page may be saved locally and/or remotely and may be used subsequently for a variety of purposes (e.g., auditing, debugging, customizing a page for other users, etc.).

Generally speaking, a docked page reflects the state, arrangement and/or context of the page from which it originated. For example, since page 500 has the thumbnail display option selected (as opposed to the detailed display, where each task would take up an entire row), the tasks are arranged in a 2×3 array. Similarly, the tasks are arranged by the assignor and the docked page (if/when retrieved and displayed) would display the tasks in the same order and arrangement shown here. Some embodiments where the docked page is automatically updated or frozen are described in more detail below.

As will be shown in more detail below, the docked page is also an interactive page. For example, if clicking on task 510 would cause the associated document to be displayed and editing controls to be displayed, clicking on that task in the corresponding docked page (not shown) would cause the same document and editing controls to be displayed.

After docking page 500, the user navigates to the documents page by selecting documents (508) from the column on the left. The following figure shows the page which is displayed in response to that selection.

Figure 6:
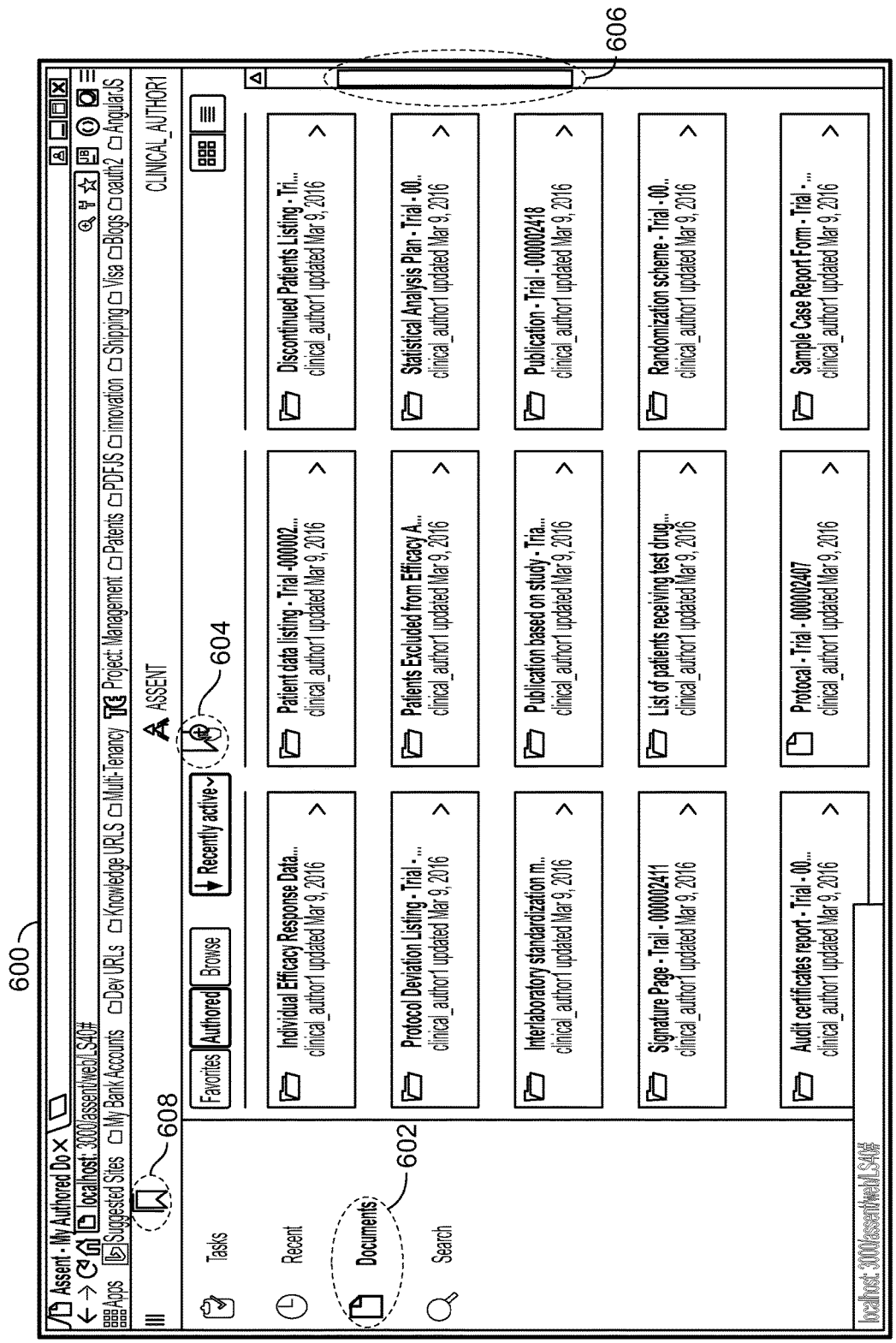
FIG. 6 is a diagram illustrating an embodiment of a Documents page which includes a docking bookmark.

FIG. 6 is a diagram illustrating an embodiment of a Documents page which includes a docking bookmark. In the example shown, page 600 is displayed after documents 602 is selected. Documents page 600 shows all of the documents which are accessible to the user (in this example, clinical_author1) based on that user's access permission. For example, the user may be working on certain projects or products and has access to documents related to those projects or products. Or, the user may have a certain level of authority or role which come with certain responsibilities and access to certain documents (e.g., employee performance reviews, feedback on interview candidates, etc.).

Page 600 includes a docking bookmark (604), for example because the corresponding configuration file or set of configuration information has the docking setting set to true. In the state shown, only those document which are authored by the user are shown and the relevant documents are sorted based on recent activity. After scrolling down using scrollbar 606 (not shown), the user decides to dock page 600 and presses docking bookmark (604). Note, for example, that scrollbar 606 is not at its highest position. In response, a docked copy of page 600 is stored (not shown).

In some embodiments, a docked page includes all documents which have been retrieved for page 600. For example, in such embodiments, the docked page would also store information for the topmost documents which are not shown in this view. For example, it may take a significant amount of time to retrieve documents from a remote enterprise content management system, so it may be desirable to save any documents that have already been retrieved from the enterprise content management system.

Alternatively, in some embodiments, a docked page only includes information for objects that are visible or otherwise displayed in the current view or context. For example, in this figure, that would mean excluding the most active documents which are not visible in this figure, given the position of the scrollbar 606. This may be desirable in applications or environments where storage is more limited and/or more expensive (e.g., if the docked page is stored locally and the user device is a smartphone or a tablet as opposed to a desktop or laptop computer).

After docking the two exemplary pages as described above, the user decides to access the docked pages. In this example, bookmark 608 is used to access the docked pages. Naturally, any user interface control may be used to access pages which have been docked; the technique is not limited to a bookmark.

Figure 7:
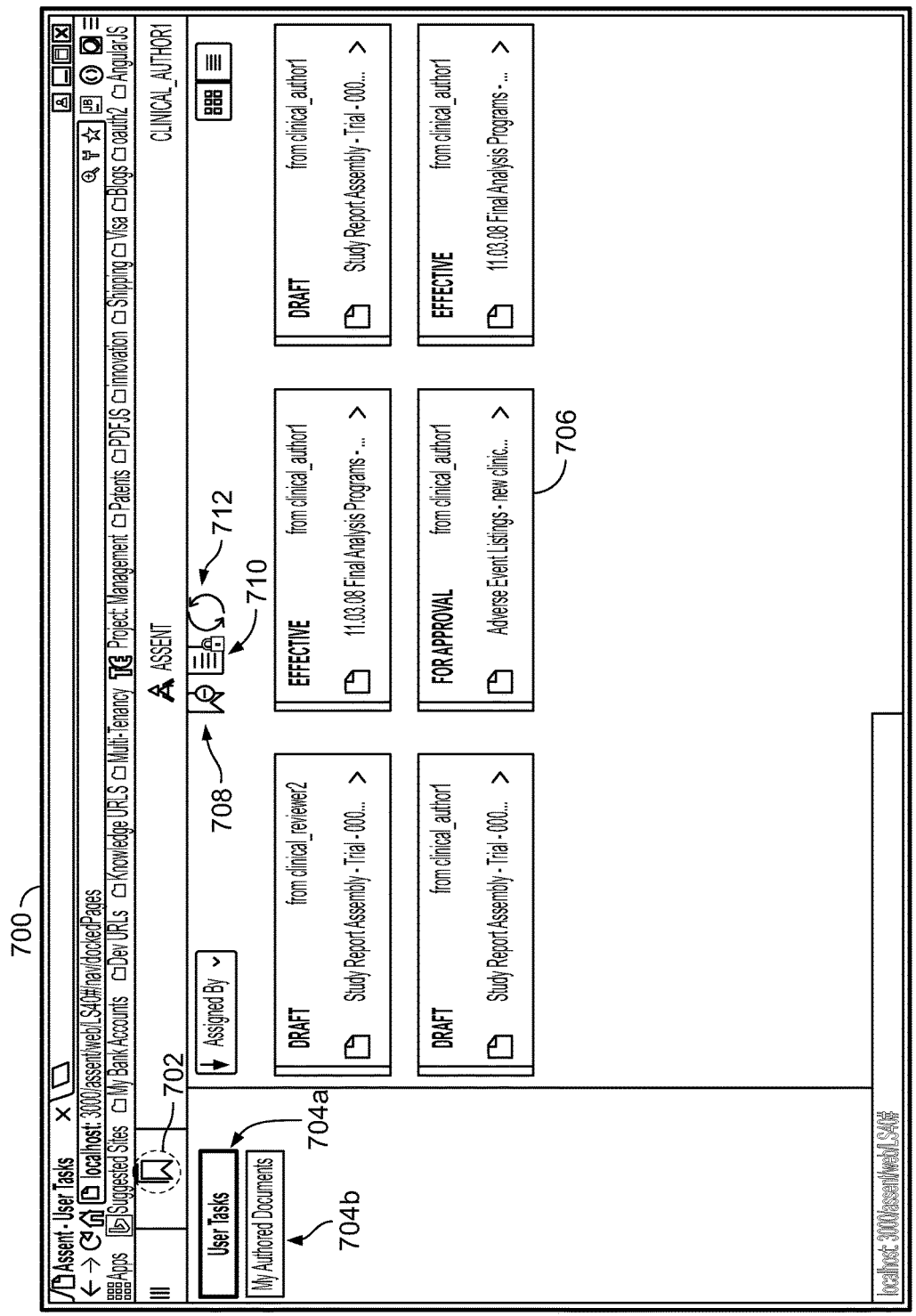
FIG. 7 is a diagram illustrating an embodiment of a page associated with displaying docked pages.

FIG. 7 is a diagram illustrating an embodiment of a page associated with displaying docked pages. In this example, since the User Tasks page was docked first (see FIG. 5) before the My Authored Documents page was docked (see FIG. 6), the User Tasks page is displayed initially or as a default. Note that Users Tasks button 704*a* is darker than My Authored Documents button 704*b*, indicating that the docked page currently displayed is the former and not the latter. To access the My Authored Documents docked page, the user would press button 704*b*.

As described above, the state and/or context of the docked page matches that of the page at the time the docking was performed. Note, for example, that the tasks are laid out or otherwise arranged in the same 2×3 array and in the same order as that shown in FIG. 5.

Also as described above, the docked page is interactive. For example, if the user pressed on task button 706, the associated document and any associated user interface controls to complete that task would be displayed (e.g., user interface controls to annotate the draft, approve the draft, etc.). This response matches the response which would have occurred had the non-docked and/or original page been interacted with in a similar manner. To put it another way, the user has experiences the same application responses with the docked page shown in FIG. 7 as they would from the original page shown in FIG. 5.

Page 700 includes additional user interface controls associated with other docking related operations or features. In this example, user interface control 708 (in this example, a bookmark with a minus sign) permits a user to de-dock the currently displayed docked page. In response to selecting user interface control 708, any local and/or remote docked pages may be deleted and/or page 700 may be updated to display some other docked page.

User interface control 710 (in this example, a document icon with a lock) permits a user to freeze the currently displayed docked page. For example, suppose the user freezes the docked page shown and subsequently reviews and approves of the document associated with approval task 706. Since the User Tasks page is locked, the User Tasks page (shown here) would still retain task 706 (e.g., in the For Approval state) even though the user has completed the approval task. Or, if the user was assigned a new task after the User Tasks page was frozen, that new task would not be reflected in the frozen User Tasks docked page.

User interface control 712 (in this example, two arrows forming a circle) permits a user to have the displayed docked page automatically update (e.g., even in the background). For example, if the user completed approval task 706 after configuring the docked User Tasks page (shown) to automatically update, the web-based application would automatically update the docked page (e.g., even if that page was not being displayed or otherwise rendered) to reflect completion of approval task 706. This might, for example, include updating the docked page so that approval task 706 is no longer displayed and adjacent task(s) are shifted so there are not gaps. Similarly, if a new task is assigned to the user, the docked page would be automatically updated with the new tasks. Naturally, the updates are sent to the appropriate device (e.g., the user device and/or an application server) for storage.

In some embodiments, some other user interface to access and/or manage docked pages is made available to a user. For example, there may be a search feature to search for docked pages matching some criteria (e.g., received from a certain user, shared with a certain user, having a certain word in the comments section, docked within a certain time period, docked from a certain page, etc.). Other exemplary tools or services to manage docked pages includes tools or services to group docked pages together (e.g., because the user may have many docked pages and groups may enable the user to better manage a large collection of docked pages) or the ability to forward a selected docked page to additional users. Similarly, docked pages may be arranged or displayed in some other manner besides that shown here.

In some embodiments, a web-based application permits a user to specify some information and/or configuration associated with the docked page. The following illustrates an example of an input page via which a user can specify such information.

Figure 8:
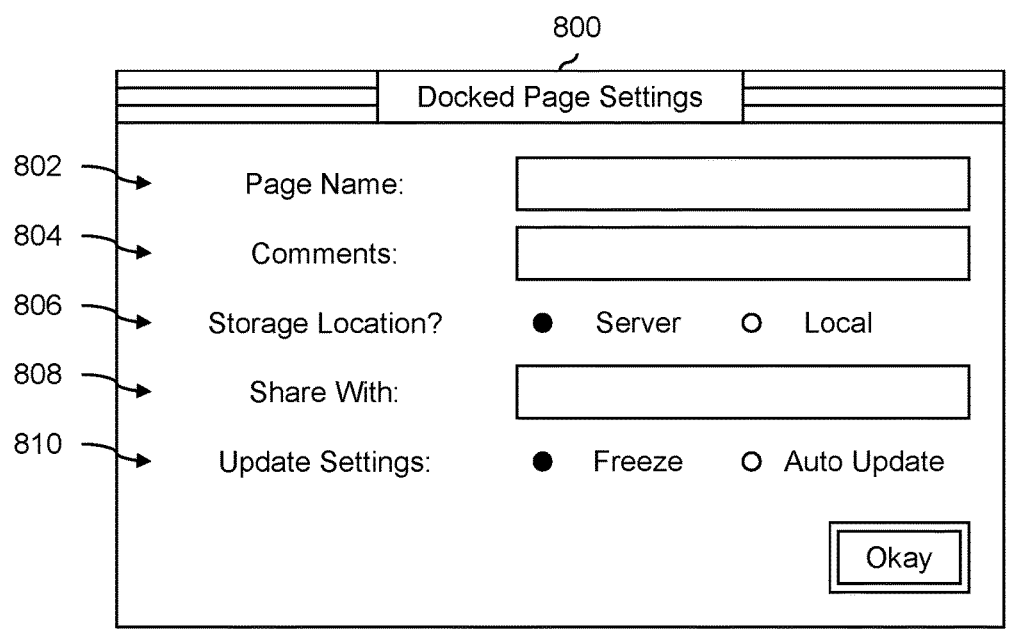
FIG. 8 is a diagram illustrating an embodiment of an input page via which a user can specify settings associated with a docked page.

FIG. 8 is a diagram illustrating an embodiment of an input page via which a user can specify settings associated with a docked page. In the examples of FIG. 5 and FIG. 6, input page 800 may be displayed in response to selection of docking bookmark 504 or docking bookmark 604, respectively. In the context of FIG. 1, input page 800 may be displayed after step 100.

Page name field 802 permits a user to specify (if desired) a name for the page being docked. In some embodiments, if no page name is specified, the name of the page (e.g., specified in some configuration file or configuration information) is used as the (default) page name. For example, in FIG. 7, the list of docked pages in the column at the left includes either a user-specified page name or a default page name for each docked page.

Comments field 804 permits a user to specify (if desired) some comments or a note about the page being docked. For example, this may be useful if the docked page is being shared with other users, or if the user wants to save a note about what state or context this particular docked page has.

Storage location field 806 permits a user to specify (if desired) where the docked page is to be stored. In this example, the user can specify either a server (e.g., an application server), locally, or both. In this example if no location is specified then a local copy is stored.

Share field 808 permits a user to specify (if desired) other users with whom the docked page should be shared. In various embodiments, field 808 uses any number of actions or tools to assist in the specification of other users (e.g., auto complete, auto suggest, etc.). In some embodiments, the input page remembers any previously specified users.

Update settings field 810 permits a user to specify (if desired) how the docked page should be updated, if at all. If the freeze radio button is selected, then the docked page is frozen and is not updated to reflect (as an example) subsequent context, state information, and/or user interactions with the web-based application after the page was docked. If the auto update radio button is selected, then the docked page is updated to reflect (as an example) subsequent context, state information, and/or user interactions with the web-based application after the page was docked.

Figure 9:
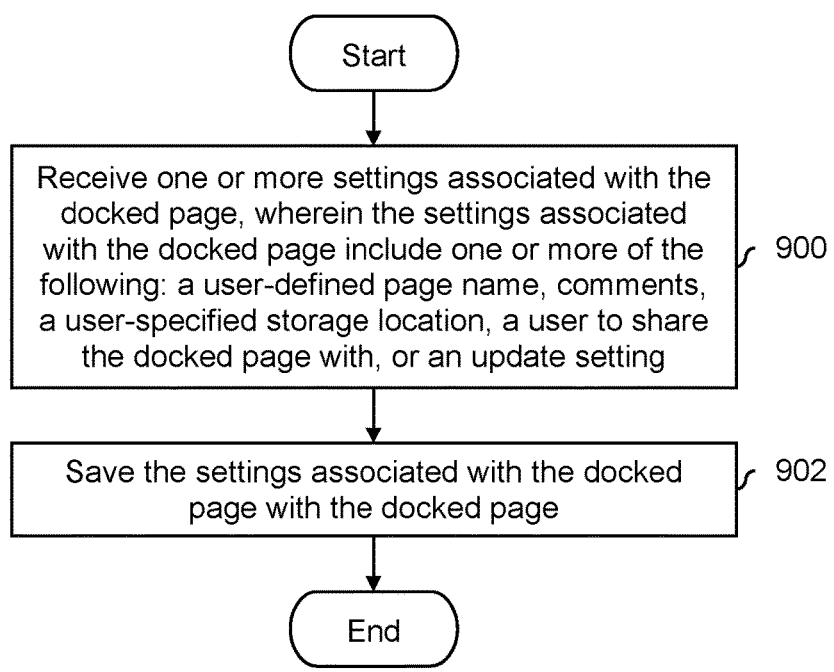
FIG. 9 is a flowchart illustrating an embodiment of a process to obtain and store settings associated with a docked page.

FIG. 9 is a flowchart illustrating an embodiment of a process to obtain and store settings associated with a docked page. As shown in the previous figure, a user may be permitted (if/where desired) to specify any number of settings or other fields associated with each docked page.

At 900, one or more settings associated with the docked page are received, wherein the settings associated with the docked page include one or more of the following: a user-defined page name, comments, a user-specified storage location, a user to share the docked page with, or an update setting. See, for example, the previous figure.

At 902, the settings associated with the docked page are saved with the docked page. For example, the settings may be XML fields (e.g., where/when defined by the user).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
display, via a web-based application that runs on an Internet browser application, a displayed page and a first user interface control, wherein the displayed page is obtained from an enterprise content management system, including by determining which content stored on the enterprise content management system is accessible based at least in part on context;
receive, via the first user interface control, a first indication to dock the displayed page;
in response to receiving the first indication, save the displayed page in renderable form in order to obtain a docked page, wherein:
in the event the docked page is saved on an application server associated with the web-based application, the docked page includes information for an invisible object that is not displayed in a view associated with when the first indication to dock the displayed page occurred; and
in the event the docked page is saved on a user device, the docked page excludes the information for the invisible object that is not displayed in the view associated with when the first indication to dock the displayed page occurred;
display, via the web-based application, a second user interface control;
receive, via the second user interface control, a second indication to display the docked page; and
in response to receiving the second indication, display the docked page in the web-based application, including by obtaining, from the application server associated with the web-based application or the user device, the docked page saved in renderable form and without communicating with the enterprise content management system to again determine which content stored on the enterprise content management system is accessible based at least in part on context.

2. The system recited in claim 1, wherein the docked page is further saved to one or more user-specified locations.

3. The system recited in claim 1, wherein the memory is further configured to provide the processor with instructions which when executed cause the processor to:
access configuration information associated with the displayed page; and
determine that the configuration information associated with the displayed page permits the displayed page to be docked.

4. The system recited in claim 1, wherein the memory is further configured to provide the processor with instructions which when executed cause the processor to:
receive one or more settings associated with the docked page, wherein the settings associated with the docked page include one or more of the following: a user-defined page name, comments, a user-specified storage location, a user to share the docked page with, or an update setting; and
save the settings associated with the docked page with the docked page.

5. The system recited in claim 1, wherein the user device includes one or more of the following: a smartphone or a tablet.

6. A method, comprising:
displaying, via a web-based application that runs on an Internet browser application, a displayed page and a first user interface control, wherein the displayed page is obtained from an enterprise content management system, including by determining which content stored on the enterprise content management system is accessible based at least in part on context;
receiving a first selection on the first user interface control;
in response to receiving the first selection on the first user interface control, displaying settings options to dock the displayed page,
wherein the settings options are further configured with instructions that, upon receiving a second selection, save the displayed page in renderable form to storage on an application server, including a docked page with information for an invisible object that is not displayed in a view associated with an occurrence of a first indication to dock the displayed page, and wherein the settings options are further configured with instructions that, upon receiving a third selection, save the displayed page in renderable form to storage on a user device, wherein the docked page excludes the information for the invisible object that is not displayed in the view associated with the occurrence of the first indication to dock the displayed page;

receiving, via the settings options, the second selection or the third selection;

receiving, via the settings options, a fourth selection;

in response to receiving the fourth selection, saving the displayed page in renderable form in order to obtain a docked page by executing the instructions corresponding to the selected settings option;

displaying, via the web-based application, a third user interface control;

receiving, via the third user interface control, a second indication to display the docked page; and in response to receiving the second indication, displaying the docked page in the web-based application, including by obtaining, from the storage corresponding to the selected settings option, the docked page saved in renderable form and without communicating with the enterprise content management system to again determine which content stored on the enterprise content management system is accessible based at least in part on context.

7. The method recited in claim 6, wherein the docked page is further saved to one or more user-specified locations.

8. The method recited in claim 6 further comprising:
accessing configuration information associated with the displayed page; and
determining that the configuration information associated with the displayed page permits the displayed page to be docked.

9. The method recited in claim 6 further comprising:
receiving one or more settings associated with the docked page, wherein the settings associated with the docked page include one or more of the following: a user-defined page name, comments, a user-specified storage location, a user to share the docked page with, or an update setting; and
saving the settings associated with the docked page with the docked page.

10. The method recited in claim 6, wherein the user device includes one or more of the following: a smartphone or a tablet.

11. A computer program product, the computer program product being embodied in a non-transitory computer readable storage medium and comprising computer instructions for:
displaying, via a web-based application that runs on an Internet browser application, a displayed page and a first user interface control, wherein the displayed page is obtained from an enterprise content management system, including by determining which content stored on the enterprise content management system is accessible based at least in part on context;

receiving, via the first user interface control, a first indication to dock the displayed page;

in response to receiving the first indication, saving the displayed page in renderable form in order to obtain a docked page, wherein:
in the event the docked page is saved on an application server associated with the web-based application, the docked page includes information for an invisible object that is not displayed in a view associated with when the first indication to dock the displayed page occurred; and
in the event the docked page is saved on a user device, the docked page excludes the information for the invisible object that is not displayed in the view associated with when the first indication to dock the displayed page occurred;

displaying, via the web-based application, a second user interface control;

receiving, via the second user interface control, a second indication to display the docked page; and in response to receiving the second indication, display the docked page in the web-based application, including by obtaining, from the application server associated with the web-based application or the user device, the docked page saved in renderable form and without communicating with the enterprise content management system to again determine which content stored on the enterprise content management system is accessible based at least in part on context.

12. The computer program product recited in claim 11, wherein
the docked page is further saved to one or more user-specified locations.

13. The computer program product recited in claim 11 further comprising computer instructions for:
accessing configuration information associated with the displayed page; and
determining that the configuration information associated with the displayed page permits the displayed page to be docked.

14. The computer program product recited in claim 11 further comprising computer instructions for:
receiving one or more settings associated with the docked page, wherein the settings associated with the docked page include one or more of the following: a user-defined page name, comments, a user-specified storage location, a user to share the docked page with, or an update setting; and
saving the settings associated with the docked page with the docked page.

15. The computer program product recited in claim 11, wherein the user device includes one or more of the following: a smartphone or a tablet.

* * * * *